(12) United States Patent
Coto-Lopez (10) Patent No.: US 9,113,175 B2
(45) Date of Patent: Aug. 18, 2015

(54) METHOD TO PROVIDE A VIRTUAL COCKPIT EXPERIENCE TO THE FLYING PASSENGER

(71) Applicant: Airbus Operations GmbH, Hamburg (DE)

(72) Inventor: Gerald Coto-Lopez, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/103,485

(22) Filed: Dec. 11, 2013

(65) Prior Publication Data

US 2014/0173669 A1    Jun. 19, 2014

Related U.S. Application Data

(60) Provisional application No. 61/737,124, filed on Dec. 14, 2012.

(30) Foreign Application Priority Data

Dec. 14, 2012   (EP) .................................... 12197216

(51) Int. Cl.
*H04N 7/18*         (2006.01)
*H04N 21/214*       (2011.01)
*H04N 21/2187*      (2011.01)
*H04N 21/414*       (2011.01)

(52) U.S. Cl.
CPC ....... *H04N 21/2146* (2013.01); *H04N 21/2187* (2013.01); *H04N 21/41422* (2013.01); *H04N 7/18* (2013.01)

(58) Field of Classification Search
CPC .......................... H04N 21/214; H04N 21/2146
See application file for complete search history.

(56) References Cited

U.S. PATENT DOCUMENTS

2003/0158943 A1*  8/2003  Kim et al. ...................... 709/227
2003/0200546 A1* 10/2003  Keen et al. ...................... 725/76
2005/0278753 A1* 12/2005  Brady et al. .................... 725/76

* cited by examiner

*Primary Examiner* — Joshua Taylor
(74) *Attorney, Agent, or Firm* — Greer, Burns & Crain Ltd.

(57) ABSTRACT

A processing unit for providing aircraft information to passengers of an aircraft, a system comprising the processing unit, an aircraft comprising the system, a method for providing aircraft information to passengers of an aircraft, as well as a computer program for performing the method. The processing unit comprises: a receiving component for receiving cockpit video data representing one or more cockpit video images of at least a section of the cockpit of the aircraft; and a processing component for processing the received cockpit video data such that the processed cockpit video data is retrievable on demand to provide the one or more cockpit video images to the passengers of the aircraft.

14 Claims, 4 Drawing Sheets

Fig. 1

METHOD TO PROVIDE A VIRTUAL COCKPIT EXPERIENCE TO THE FLYING PASSENGER

CROSS-REFERENCES TO RELATED APPLICATIONS

This application claims the benefit of the U.S. Provisional Application No. 61/737,124, filed on Dec. 14, 2012, and of the European patent application No. 12 197 216.0 filed on Dec. 14, 2012, the entire disclosures of which are incorporated herein by way of reference.

BACKGROUND OF THE INVENTION

The present invention relates a processing unit for providing aircraft information to passengers of an aircraft, to a system comprising the processing unit, to an aircraft comprising the system, to a corresponding method for providing aircraft information to passengers of an aircraft, as well as to a computer program for performing the method.

In modern aircraft, entertainment systems for providing in-flight entertainment to passengers of the aircraft are becoming increasingly important. These entertainment systems, which are normally referred to as In-Flight Entertainment (IFE) systems, provide entertainment to aircraft passengers during a flight. Modern IFE systems provide different types of multimedia content, e.g., audio content and video content, to enhance the passenger experience. For this purpose, IFE systems generally comprise one or more servers, from which the different content like video content (e.g., movies, TV shows, video clips and the like), audio content, games, moving-map content and the like, can be accessed and retrieved on demand by the passengers. The demanded content is then typically provided to the passenger on different output devices, e.g. on cabin overhead video monitors, personal in-seat video monitors, headphones and similar output devices. Currently, modern IFE systems may incorporate video feeds from external camera sources in order to provide passengers with external aircraft views on the cabin overhead video monitors or on the personal in-seat video monitors.

In recent years, not only airport, but also on-board security has increased dramatically. For example, passengers are no longer allowed to visit the cockpit during flight. Many people, however, are fascinated by flight and the process of flying and they increasingly removed from the magic of the process. By way of existing IFE systems, it is intended to give the seated passenger all the electronic, communication and infotainment amenities that he/she has available on the ground, at home or at the office. However, being in the air itself is an unusual environment and one that is fascinating in ways that the home and office cannot be. Currently, there are DVDs available for purchase that show cockpit views and audio of whole flights, e.g., from Hamburg to la Palma. These serve to show the fascination and interest in flight from a cockpit perspective. However, there is an increasing demand to bring the fascination of flight to the seated passengers themselves during flight in a realistic manner.

SUMMARY OF THE INVENTION

It is thus an object of the present invention to provide a processing unit, a system comprising the processing unit, an aircraft comprising the system, a corresponding method, as well as a computer program for performing the method, by means of which video images of the cockpit can be provided to passengers of an aircraft in a realistic and flexible manner.

According to a first aspect, a processing unit for providing aircraft information to passengers of an aircraft is provided. The processing unit comprises a receiving component and a processing component. The receiving component is configured to receive cockpit video data representing one or more cockpit video images of at least a section of the cockpit of the aircraft. The processing component is configured to process the received cockpit video data such that the processed cockpit video data is retrievable on demand to provide the one or more cockpit video images to the passengers of the aircraft.

The one or more cockpit video images may be regarded as real video images taken or captured by means of at least one video camera, rather than virtual images. In this context, the one or more cockpit video images may also be referred to as captured cockpit video images. The one or more cockpit video images may be provided in real time (leaving aside the normal runtime of signals) to the passengers of the aircraft. For example, the received cockpit video data representing the one or more (captured) cockpit video images may be processed by the processing component to generate processed cockpit video data, wherein said processed cockpit video data is adapted such that the one or more cockpit video images are presentable on onboard display devices provided on board the aircraft like cabin overhead video monitors and/or personal in-seat video monitors. The processed cockpit video data may be retrievable on demand in response to a user request like a passenger input. In order to provide the one or more (captured) cockpit video images to the passengers of the aircraft the processing unit may comprise a forwarding component which is configured to forward the processed cockpit video data to at least one of the plurality of display devices provided on board the aircraft in response to the user request.

The receiving component may further be configured to receive cockpit audio data representing voice communications to and from the cockpit of the aircraft. In this context, the processing component may further be configured to process the received cockpit audio data such that the processed cockpit audio data is retrievable on demand to provide the voice communications to and from the cockpit to the passengers of the aircraft.

The voice communications to and from the cockpit of the aircraft may be regarded as real voice communications to and from the cockpit crew, e.g., to and from the pilot(s), rather than virtual speech information. The voice communications to and from the cockpit may also be referred to as cockpit radio communications, i.e., voice communications which are normally transmitted to and from the cockpit by means of radio signals. For example, the voice communications may be air traffic control communications between the pilot(s) and an air traffic controller in a tower of an airport or cockpit crew members of another aircraft. In this context, the voice communications may be provided in real time (leaving aside the normal runtime of signals) to the passengers of the aircraft. For example, the received cockpit audio data representing the voice communications may be processed by the processing component to generate processed cockpit audio data, wherein said processed cockpit audio data is adapted such that the voice communications to and from the cockpit are audible by means of onboard headphones or speaker devices provided on board the aircraft. The processed cockpit audio data may be retrievable on demand in response to a user request like a passenger input. In order to provide the voice communications to the passengers of the aircraft the processing unit may comprise a forwarding component which is configured to forward the processed cockpit audio data to at least one of the headphone or speaker devices provided on board the aircraft in response to the user request.

The receiving component may further be configured to receive aircraft data comprising at least one of performance data of the aircraft and navigation data of the aircraft. In this context, the processing component may further be configured to process the received aircraft data such that the processed aircraft data is retrievable on demand to provide at least one of virtual cockpit instruments and moving-map information illustrating the aircraft data to the passengers of the aircraft.

The performance data may be derived from a performance database onboard the aircraft and may comprise information about the drag, thrust, fuel flow, speed/altitude envelope, thrust limits, the actual speed, the actual altitude and/or the consumption of the aircraft and the like. The navigation data may be derived by considering information provided by an onboard navigation system. For example, the navigation data may comprise information about the speed, altitude, heading and/or yaw of the aircraft and the like. In this context, the processed aircraft data may be provided in real time (leaving aside the normal runtime of signals) to the passengers of the aircraft. For example, the received aircraft data may be processed by the processing component to generate processed aircraft data, wherein said processed aircraft data is adapted to be presentable as at least one of virtual cockpit instruments and moving-map information on at least one of the display devices provided on board the aircraft. The processed aircraft data may be retrievable on demand in response to a user request like a passenger input. In order to provide the aircraft data to the passengers of the aircraft the processing unit may comprise a forwarding component which is configured to forward the processed aircraft data to at least one of the display devices provided on board the aircraft in response to the user request.

The receiving component may further be configured to receive external video data representing one or more video images from outside the aircraft. In this context, the processing component may further be configured to process the received external video data such that the processed external video data is retrievable on demand from the processing unit to provide the video images from outside the aircraft to the passengers of the aircraft.

The one or more video images from outside the aircraft may be regarded as real video images taken or captured by means of at least one video camera, rather than virtual images. In this context, the one or more captured video images may be provided in real time (leaving aside the normal runtime of signals) to the passengers of the aircraft. For example, the received external video data representing the one or more video images from outside the aircraft may be processed by the processing component to generate processed external video data, wherein said processed external video data is adapted such that the one or more video images from outside the aircraft are presentable on onboard display devices provided on board the aircraft like overhead video monitors and/or personal in-seat video monitors. The processed external video data may be retrievable on demand in response to a user request like a passenger input. In order to provide the one or more video images from outside the aircraft to the passengers of the aircraft the processing unit may comprise a forwarding component which is configured to forward the processed external video data to at least one of the display devices provided onboard the aircraft in response to the user request.

All of the aforementioned data, i.e., the cockpit video data, the cockpit audio data, the aircraft data and the external video data may be received at different ports of the processing unit.

The processing component of the processing unit may be configured to selectively combine or consolidate the cockpit video data, cockpit audio data, aircraft data and external video data. For example, the processing component may be configured to integrate at least one of the cockpit audio data, the aircraft data and the external video data into the cockpit video data such that each of the cockpit video data, cockpit audio data, aircraft data and external video data is selectively retrievable on demand by the passengers of the aircraft from the processing unit. Each of the cockpit video data, the cockpit audio data, the aircraft data and the external video data may be retrievable by a passenger of the aircraft in isolation from or in combination with each other in accordance with a user input.

The cockpit video data may be structured in a cockpit video feed. Likewise, the cockpit audio data may be structured in a cockpit audio feed and/or the external video data may be structured in an external video feed. The respective video and audio feeds may then be input into the processing unit to be processed by the processing unit in order to be retrievable on demand.

Generally, a data feed may be regarded as a mechanism for users to receive updated data from data sources. Data feeds are commonly used by real-time applications in point-to-point settings as well as on the World Wide Web. In the present scenario, the video and audio feeds may be regarded as a mechanism for the passengers of the aircraft to receive updated video and audio data, i.e. updated cockpit video data, updated cockpit audio data, updated aircraft data and/or updated external video data.

According to a second aspect, a system for providing aircraft information to passengers of an aircraft is provided. The system comprises at least one video camera for capturing one or more cockpit video images of at least a section of the cockpit of the aircraft and the processing unit as described herein.

The system may further comprise a plurality of passenger or onboard display devices. The passenger or onboard display devices may be coupled to the processing unit via at least one of a wired or wireless connection. The wired connection may be configured as or may comprise a data bus. In case of a data bus connection, each of the plurality of passenger or onboard display devices may be coupled to the processing unit via the data bus such that the processed cockpit video data is retrievable on demand over the data bus to display the one or more cockpit video images on at least one of the passenger or onboard display devices. For example, the one or more cockpit video images may be displayed on the passenger display device on which a user request requesting the processed cockpit video data was input. Similarly, the processed external video data may be retrievable on demand over the wireless or wired connection, e.g., the data bus, to display the one or more video images from outside the aircraft on at least one of the passenger display devices. Alternatively or additionally, the processed aircraft data may be retrievable on demand over the data bus to display the one or more virtual instruments and/or moving-map information on at least one of the passenger display devices. For example, the processed external video data and/or the processed aircraft data may be retrievable simultaneously with the cockpit video data. Further, the one or more (captured) cockpit video images may be output together with the video images from outside the aircraft and/or the virtual cockpit instruments and/or the moving-map information illustrating the aircraft data on at least one of the passenger display devices.

The passenger or onboard display devices may be integrated into the seats of the aircraft and may thus be configured as in-seat display devices. Alternatively, the passenger or onboard display devices may be configured as or may be displays of passengers' mobile terminals, e.g., mobile phones, smartphones, tablet computers or the like. In this respect, an application (in short: app) may be downloaded by passengers on their mobile terminals and then executed on the mobile terminals. When running, the app may retrieve the processed cockpit video data from the processing unit and may then instruct the display of the mobile terminal (on which it is running) to display the one or more cockpit images. Additionally, also the processed aircraft data and/or the processed external video data may be retrieved by the mobile terminal from the processing unit to display the corresponding information, i.e., the one or more video images from outside the aircraft and/or the one or more virtual instruments and/or the moving-map information.

The system may further comprise a plurality of passenger headphone devices coupleable or connectable to the processing unit via the wireless or wired connection, e.g., the data bus. The passenger headphone devices may be coupled to the processing unit via their associated passenger display device. Each of the plurality of passenger headphone devices may be coupled to the data bus such that the processed cockpit audio data is retrievable on demand over the data bus to provide the voice communications to and from the cockpit by means of at least one of the passenger headphone devices. For example, the processed cockpit audio data may be retrievable simultaneously with the processed cockpit video data, the processed aircraft data and/or the processed external video data. Further, the voice communications to and from the cockpit may be output together with the one or more (captured) cockpit video images, the one or more video images from outside the aircraft, the virtual cockpit instruments and/or the moving-map information.

The system may further comprise at least one preventing device for preventing at least one of the cockpit video data and the cockpit audio data from being retrievable on demand by the passengers of the aircraft. For preventing at least one of the cockpit video data and the cockpit audio data from being retrievable on demand by the passengers of the aircraft, the at least one preventing device may be activated or operated by a cockpit crew member or the like.

According to a first possible implementation of the at least one preventing device, the at least one preventing device may be configured to prevent at least one of the cockpit video data and the cockpit audio data from being input into the processing unit. In this way, the cockpit video data and/or the cockpit audio data does not even arrive at the processing unit and can therefore not be retrieved by the passengers. According to one exemplary realization of the at least one preventing device according to the first possible implementation, the at least one preventing device may be configured as or comprise one or more switches (mute switches) or one or more muting buttons arranged in the cockpit for muting the video and/or audio feed to the processing unit and thereby capping the passengers from the cockpit information. For example, the system may comprise a video preventing device configured to prevent, when activated or operated, that the cockpit video data is transmitted (from the cockpit) to and/or input into the processing unit and an audio preventing device configured to prevent, when activated or operated, that the cockpit audio data is transmitted (from the cockpit) to and/or input into the processing unit.

According to a second possible implementation of the at least one preventing device, the at least one preventing device may be configured to prevent at least one of the processed cockpit video data and the processed cockpit audio data from being retrieved from the processing unit. In accordance with the second possible implementation, the at least one preventing device may be included in the processing unit. In other words, the cockpit video data and/or the cockpit audio data may be input into the processing unit even if the at least one preventing device is activated or operated but the at least one preventing device may prevent, when activated or operated, the forwarding of the processed cockpit video data and/or the processed cockpit audio data from the processing unit to the passenger display device(s).

The system may comprise or may be configured as an In-Flight Entertainment (IFE) system. For example, the processing unit may be configured as or may comprise a server of the IFE system, i.e., an IFE server.

According to a third aspect, an aircraft comprising the system as described herein is provided. In this respect, the at least one video camera may be arranged in the cockpit of the aircraft in such a manner so as to capture the one or more cockpit video images. For example, the at least one video camera may be located in the overhead area of the cockpit looking forward, i.e., the direction of the front window or flight direction. The at least one video camera may be arranged to look forward over the shoulders of the pilots such that both pilots, at least some of the cockpit instruments and at least a portion of the front cockpit window are captured by the at least one video camera.

According to a fourth aspect, a method for providing aircraft information to passengers of an aircraft is provided. The method comprises: receiving, by a processing unit, cockpit video data representing one or more cockpit video images of at least a section of the cockpit of the aircraft; and processing, by the processing unit, the received cockpit video data such that the processed cockpit video data is retrievable on demand to provide the one or more cockpit video images to the passengers of the aircraft.

According to a fifth aspect, a computer program product is provided. The computer program product comprises program code portions for performing one or more of the steps of any one of the method aspects described herein, when the computer program product is run or executed on a computer system or on one or more computing devices (e.g., a microprocessor, a microcontroller or a digital signal processor (DSP)). The computer program product may be stored on a computer-readable recording medium, such as a permanent or rewritable memory.

All of the above described aspects may be implemented by hardware circuitry and/or by software.

Even if some of the above aspects have been described herein with respect to the processing unit or the system comprising the processing unit, these aspects may also be implemented as a method or as a computer program for performing or executing the method. Likewise, aspects described as a method, or with reference to a method, may be realized by suitable units in the processing unit, the system comprising the processing unit or by means of the computer program.

BRIEF DESCRIPTION OF THE DRAWINGS

In the following, the present invention will further be described with reference to exemplary embodiments illustrated in the figures, in which.

DETAILED DESCRIPTION OF THE PREFERRED EMBODIMENTS

In the following description, for purposes of explanation and not limitation, specific details are set forth in order to provide a thorough understanding of the present invention. It will be apparent to one skilled in the art that the present invention may be practiced in other embodiments that depart from these specific details. For example, the skilled person will appreciate that the present invention may be practiced with video and audio data which are not structured in video and audio feeds, respectively, discussed below to illustrate the present invention. Also, the present invention may be practiced in any suitable network architecture network different from the bus architecture used below in order to illustrate the present invention. Even if in the below only one single server will be described, the invention may equally be practiced in a multi-server system, e.g., a server system having multiple, decentralized servers.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the present invention is described as a method, it may also be embodied in a device (i.e., the processing unit and the system comprising the processing unit described below), a computer processor and a memory coupled to a processor, wherein the memory is encoded with one or more programs that perform the methods disclosed herein when executed by the processor.

Further, although the embodiments are described below with respect to a passenger display device configured as an in-seat video monitor, the invention is not limited thereto, but the passenger display device may equally also be configured as a display of a mobile terminal, e.g., a mobile phone, a smartphone, a tablet computer or the like, using which the respective user of the mobile terminal can retrieve the passenger information he/she is interested in from the processing unit by means of an application (in short: app) running on the mobile terminal. According to this alternative, each passenger may use his/her own mobile terminal to access the information he/she is interested in. However, the basic principles described below regarding the processing of the aircraft information and the retrieval of the aircraft information equally apply to this alternative.

Figure 1:
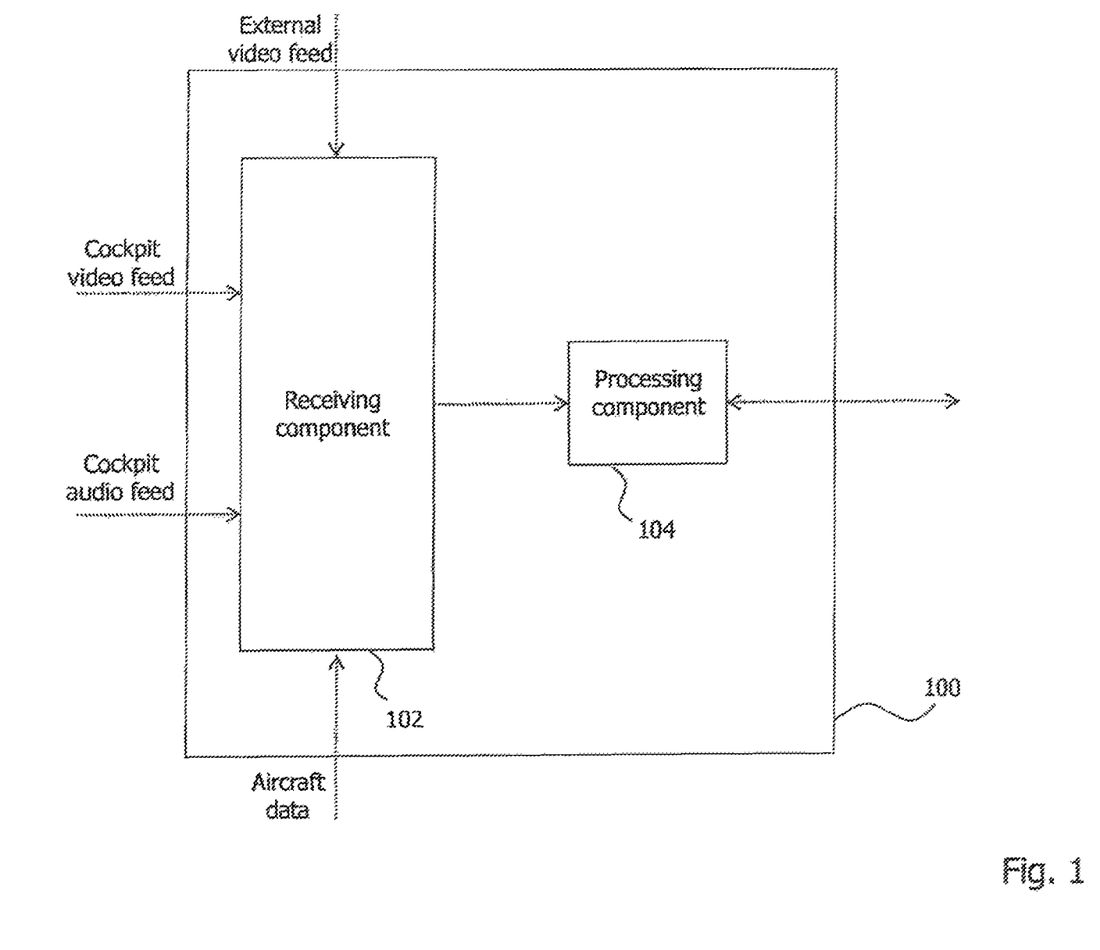
FIG. 1 schematically illustrates an embodiment of a processing unit for providing aircraft information to passengers.
Figure 2:
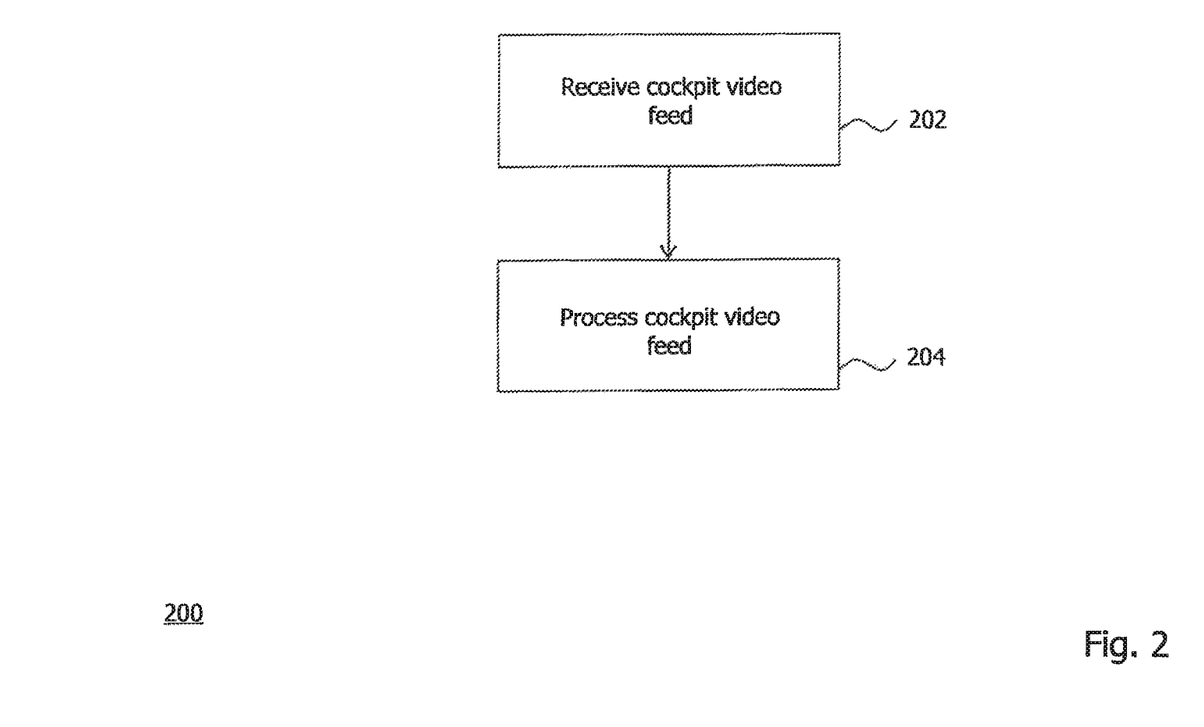
FIG. 2 illustrates a flow diagram of a method according to a first embodiment performed by the processing unit according to the embodiment of FIG. 1.

FIG. 1 schematically illustrates an embodiment of a processing unit for providing aircraft information to passengers of an aircraft. In the present embodiment, the processing unit is by way of example configured as a server of an In-Flight Entertainment (IFE) system provided onboard the aircraft, i.e., as an IFE server 100. The IFE server 100 comprises a receiving component 102 and a processing component 104. The basic operation of the IFE server 100 can be described with reference to FIGS. 1 and 2 as follows. The receiving component 102 is configured to receive in step 202 a cockpit video feed comprising cockpit video data representing one or more cockpit video images of at least a section of the cockpit of the aircraft. The processing component 104 is configured to process in step 204 the received cockpit video feed such that the processed cockpit video feed is retrievable on demand to provide the one or more cockpit video images to the passengers of the aircraft.

As schematically illustrated in FIG. 1, the receiving component 102 may also receive a cockpit audio feed, an external video feed and/or aircraft data. The cockpit audio feed comprises radio communications to and from the cockpit of the aircraft, i.e., voice communications to and from the cockpit. The external video feed comprises video images from outside the aircraft captured by at least one video camera arranged at the aircraft. The aircraft data comprises performance data provided by an avionics system of the aircraft and/or navigation data provided by a navigation system of the aircraft.

Figure 3:
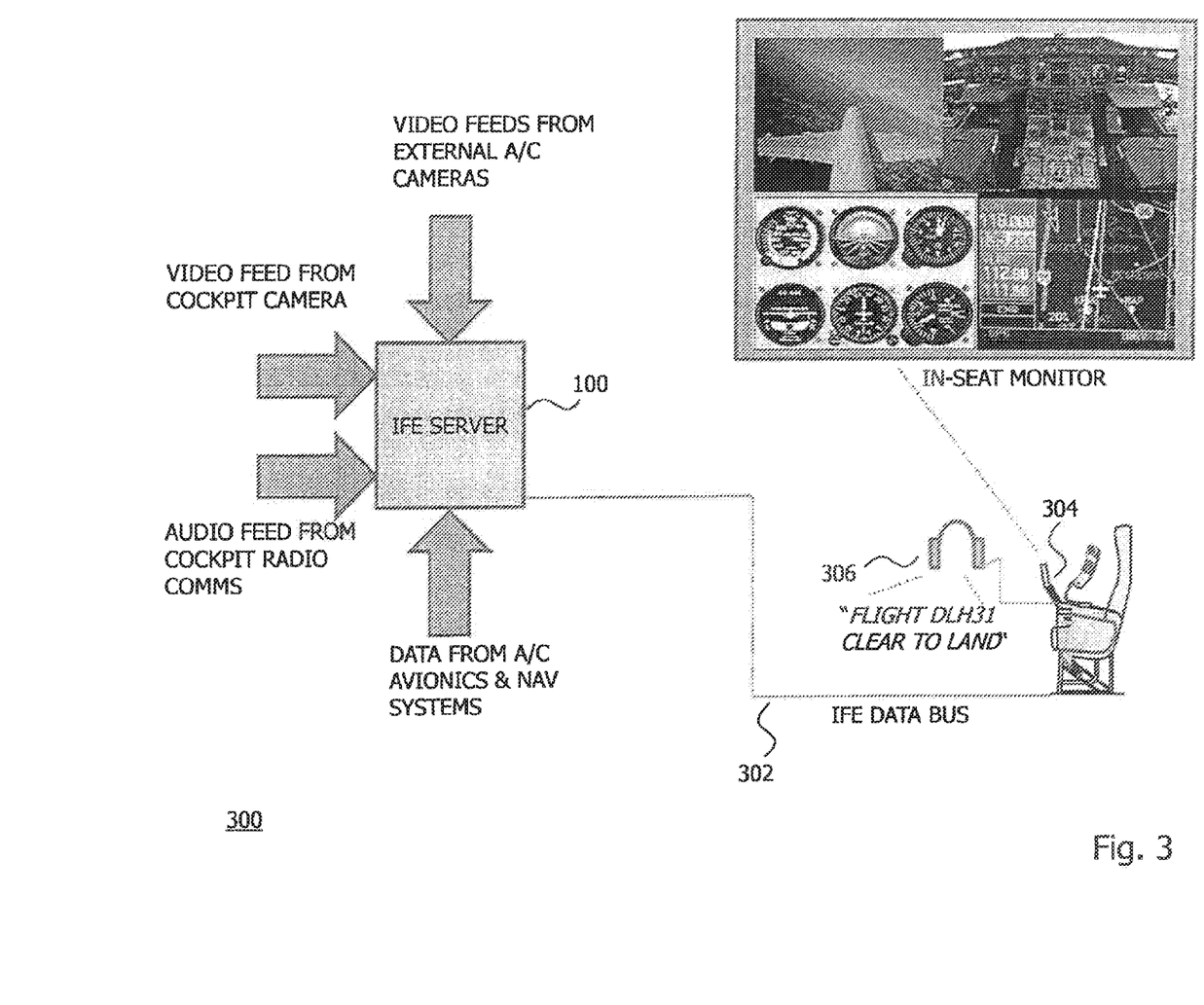
FIG. 3 schematically illustrates an embodiment of a system for providing the aircraft information to passengers comprising the processing unit according to the embodiment of FIG. 1.

FIG. 3 schematically illustrates an embodiment of a system for providing aircraft information to passengers of an aircraft comprising the IFE server 100 of FIG. 1. The system of FIG. 3 is by way of example configured as an IFE system 300. The IFE server 100 is adapted to receive the cockpit feed and one or more of the cockpit audio feed, the external video feed and/or the aircraft data.

The IFE server 100 is connected via an IFE data bus 302 to a plurality of passenger display devices. In FIG. 3 one in-seat video monitor 304 is exemplarily shown to illustrate the plurality of passenger display devices. Further, the IFE server 100 is connected, by way of example via the same IFE data bus 302, to a plurality of passenger headphone devices. In FIG. 3 one in-seat headphone 306 is exemplarily shown to illustrate the plurality of passenger headphone devices.

Figure 4:
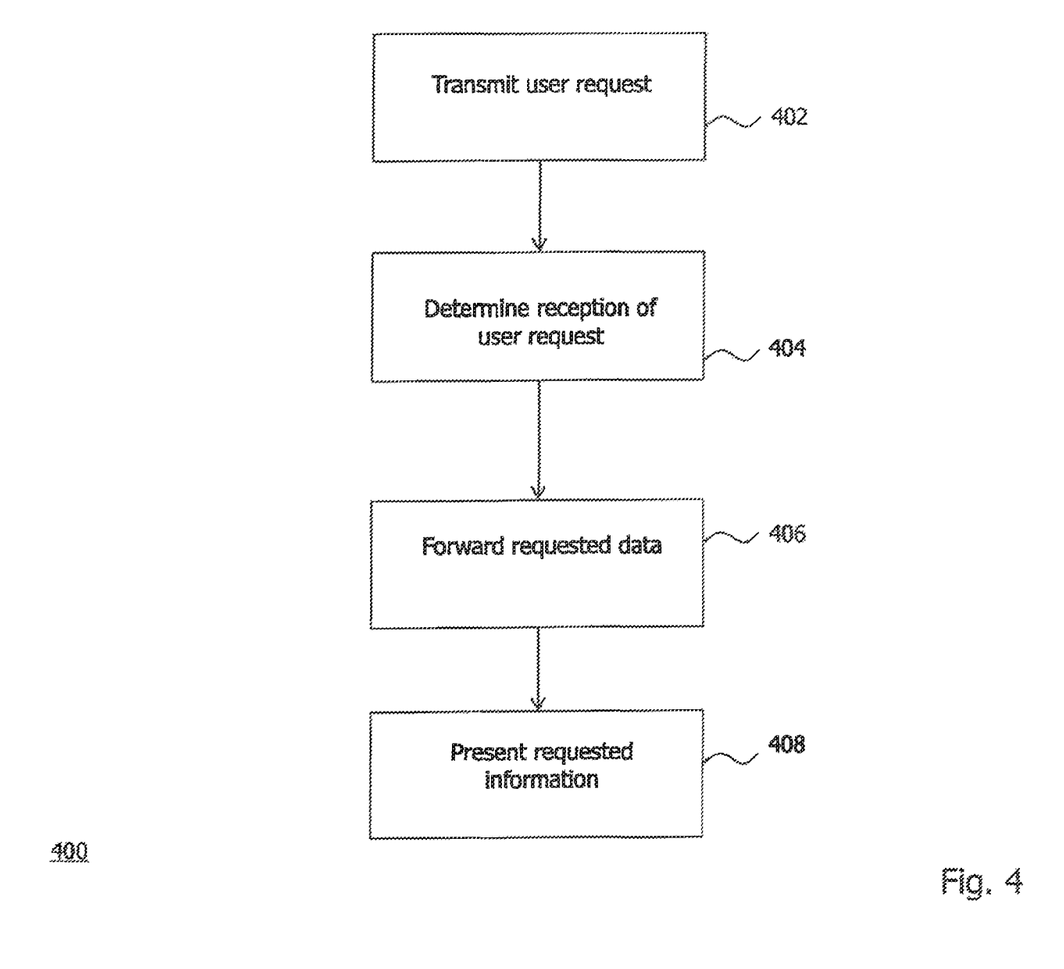
FIG. 4 illustrates a flow diagram of a method according to a second embodiment performed by the system according to the embodiment of FIG. 3.

The operation of the IFE system 300 will now be described with reference to FIG. 4. By way of example, it will in the following be assumed without limitation that the IFE server 100 is configured to receive each of the cockpit video feed, the cockpit audio feed, the external video feed and the aircraft data. However, the invention is not limited thereto, but can equally be performed when the cockpit video feed and one or more of the cockpit audio feed, the external video feed and/or the aircraft data is input into the IFE server 100.

If a passenger of the aircraft intends to be provided with aircraft information rather than to watch a movie or listen to music provided by the IFE system 300, the IFE system 300 allows the passenger to retrieve different aircraft information. For this purpose, the passenger performs a user input indicating that he/she wishes to receive aircraft information. By way of example it is assumed in the following that the passenger wishes to receive each of the cockpit video feed, the cockpit audio feed, the external video feed and the aircraft data provided by the IFE system 300 and inputs a corresponding user request. According to this example, the user selects on an input unit, e.g., the video monitor 304, which aircraft information he/she wishes to receive, namely the whole available aircraft information. Alternatively, the user may only select a subset of the available information. In response to the user input, a user request is transmitted in step 402 from the input unit, e.g., the video monitor 304, to the IFE server 100 via the data bus 302.

The IFE server 100 continuously receives and processes the cockpit video feed, the cockpit audio feed, the external video feed and the aircraft data and in this way updates the aircraft information available from the IFE system 300. Thus, in principle, updated aircraft information is always retrievable from the IFE server 100. When the IFE server 100 determines that it has received the user request via the IFE data bus 302 (step 404), it forwards the requested data in step 406 to the seat associated with the video monitor 304 on which the user request was made. For this purpose, the IFE server 100 may consolidate all of the requested data and forward the consolidated data via the data bus 302 to the video monitor 304. If, for example, the user has requested to receive the cockpit video feed, the cockpit audio feed, the external video feed and the aircraft data, the IFE server 100, more precisely, the processing component 104 of the IFE server 100, may combine the cockpit video feed, the cockpit audio feed, the external video feed and the aircraft data and may transmit the combined data to the seat of the passenger who requested the data over the IFE data bus 302.

Then, cockpit video images, external video images, virtual cockpit instruments and moving-map information illustrating the requested data are displayed on the video monitor 304 as schematically illustrated by way of example in FIG. 3. In addition, the ongoing cockpit radio communications are presented to the passenger via the headphones 306.

In case the cockpit crew intends to prevent the passenger from receiving the cockpit data (the cockpit video data and/or the cockpit audio data), at least one preventing device may be arranged in the cockpit. The preventing device may be configured as one or more mute switches or mute buttons located in the cockpit. In the following, it is assumed by way of example that the at least on preventing device is configured as a video mute switch and an audio mute switch. If the video mute switch is operated to be active, the forwarding of the cockpit video feed to the IFE server 100 is stopped and if the audio mute switch is operated to be active, the forwarding of the cockpit audio feed to the IFE server 100 is stopped. In this way, the forwarding of the cockpit video feeds and/or of the cockpit audio feeds to the IFE server 100 can be stopped and thereby the passenger cannot be presented with the corresponding information anymore. For example, if the cockpit video switch and the cockpit audio switch are operated to be active, the monitor 304 stops to display the cockpit video images and the headphone 306 stops to provide the ongoing cockpit radio communications. However, the aircraft data and/or the external video images my still be displayed on the monitor 304.

If, however, the video mute switch is operated to be inactive, the forwarding of the cockpit video feed to the IFE server 100 is resumed, and if the audio mute switch is operated to be inactive, the forwarding of the cockpit audio feed to the IFE server 100 is resumed.

By way of the IFE system 300 described above, known IFE systems can be extended by functionalities which bring the joy of flying closer to the flying passenger. The functionalities make use of video, audio and data feeds to virtually take the passenger into the cockpit. For this purpose, at least one video camera is introduced into the cockpit of the aircraft. The camera may be located in the overhead area of the cockpit looking forward over the shoulders of both pilots such that the pilots, many of the instruments and the front cockpit windows may be seen. Further, a data connection of this camera to an IFE server 100 within the IFE System 300 is provided. Still further, a connection of an audio feed between the cockpit and the IFE server 100 within the IFE System 300 may be provided. The audio feed may provide all cockpit to ground and ground to cockpit voice communications.

As further described above, e.g., two mute switches may be provided within the cockpit. By means of these switches the pilots may mute the audio feed or the video feed to the IFE system 300 at any time, thus capping the passenger from cockpit information. Further, the provision of aircraft data (performance and navigation) to the IFE server 100 may be provided. Still further, the provision of external camera images (External Taxis Aid Camera and Landscape Camera System) to the IFE system 300, more precisely, the IFE server 100, may be provided. As described above, the IFE system 300 may be configured to consolidate the information provided and make the information available to the passengers as an interactive on-demand service.

Within the IFE server 100 the incoming information is processed to provide virtual programming for the flight. For example virtual cockpit instruments show the flight status (altitude, heading, speed, yaw, etc.) while video images from the cockpit and external cameras are shown on the onboard display device(s). A further window provides moving-map information of the aircraft moving over the current terrain. Simultaneously all cockpit radio communications are audible within the individual passenger headphones. These various features may be activated by using various Graphical User Interface (GUI) options on the individual passenger touch screen monitors.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A system for providing aircraft information to passengers of an aircraft, comprising:
at least one video camera for capturing one or more cockpit video images of at least a section of the cockpit of the aircraft, wherein the at least one camera is directed toward a front cockpit window of the aircraft such that at least a portion of the cockpit instruments and at least a portion of the front cockpit window are visible;
a receiving component for receiving cockpit video data from the at least one video camera representing one or more cockpit video images of at least a section of the cockpit of the aircraft; and
a processing component for processing the received cockpit video data such that the processed cockpit video data is retrievable on demand by the passengers of the aircraft to provide the one or more cockpit video images.

2. The system of claim 1, wherein the receiving component is further configured to receive cockpit audio data representing voice communications to and from the cockpit of the aircraft, and wherein the processing component is further configured to process the received cockpit audio data such that the processed cockpit audio data is retrievable on demand to provide the voice communications to and from the cockpit to the passengers of the aircraft.

3. The system of claim 1, wherein the receiving component is further configured to receive aircraft data comprising at least one of performance data of the aircraft and navigation data of the aircraft, and wherein the processing component is further configured to process the received aircraft data such that the processed aircraft data is retrievable on demand to provide at least one of virtual cockpit instruments and moving-map information illustrating the aircraft data to the passengers of the aircraft.

4. The system of claim 1, wherein the receiving component is further configured to receive external video data representing one or more video images from outside the aircraft, and wherein the processing component is further configured to process the received external video data such that the processed external video data is retrievable on demand from the processing unit to provide the video images from outside the aircraft to the passengers of the aircraft.

5. The system of claim 1, wherein the processing component is further configured to integrate at least one of cockpit audio data representing voice communications to and from the cockpit of the aircraft, the aircraft data and external video data representing one or more video images from outside the aircraft into the cockpit video data such that each of the cockpit video data, cockpit audio data, aircraft data and external video data is selectively retrievable on demand by the passengers of the aircraft.

6. The system of claim 1, wherein the cockpit video data is structured in a cockpit video feed, cockpit audio data representing voice communications to and from the cockpit of the aircraft is structured in a cockpit audio feed and external video data representing one or more video images from outside the aircraft is structured in an external video feed.

7. The system of claim 1, wherein the system further comprises a plurality of passenger display devices coupled to the processing unit via at least one of a wired and a wireless connection such that the processed cockpit video data is retrievable on demand to display the one or more cockpit video images on at least one of the passenger display devices.

8. The system of claim 1, wherein the system further comprises that the processed cockpit video data is displayed on the passenger display device on which a user request for the processed cockpit video data was input.

9. The system of claim 1, wherein the system further comprises a plurality of passenger headphone devices coupled to the processing unit via at least one of a wired or wireless connection such that the processed cockpit audio data is retrievable on demand to provide the voice communications to and from the cockpit by means of at least one of the passenger headphone devices.

10. The system of claim 1, wherein the system further comprises at least one preventing device for preventing at least one of the cockpit video data and the cockpit audio data from being retrievable on demand by the passengers of the aircraft.

11. The system of claim 1, wherein the system comprises or is configured as an In-Flight Entertainment, IFE, system.

12. An aircraft comprising the system of claim 1.

13. A method for providing aircraft information to passengers of an aircraft, wherein the method comprises:
receiving, by a processing unit, cockpit video data representing one or more cockpit video images of at least a section of the cockpit of the aircraft including at least a portion of the cockpit instruments and at least a portion of the front cockpit window; and
processing, by the processing unit, the received cockpit video data such that the processed cockpit video data is retrievable on demand by the passengers of the aircraft to provide the one or more cockpit video images.

14. A computer program product comprising program code portions for performing the steps of claim 13 when the computer program product is run on a computer system, stored on a non-transitory computer-readable recording medium.

* * * * *